(12) United States Patent  
Fried et al.

(10) Patent No.: US 6,546,303 B1
(45) Date of Patent: Apr. 8, 2003

(54) COMPUTATION OF SUPPLY CHAIN PLANNING PROCESS EFFICIENCY

(75) Inventors: David M. Fried, Ithaca, NY (US); Thomas A. May, Underhill Center, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/683,695

(22) Filed: Feb. 5, 2002

(51) Int. Cl.[7] .............................................. G06F 17/60
(52) U.S. Cl. ........................... 700/106; 700/111; 705/1; 705/8
(58) Field of Search ................................ 700/111, 106; 705/1, 8, 10–11, 28–29

(56) References Cited

U.S. PATENT DOCUMENTS

| | | | |
|---|---|---|---|
| 5,195,041 A | 3/1993 | George et al. ............... 364/468 |
| 5,369,570 A | 11/1994 | Parad ......................... 364/401 |
| 5,787,000 A | 7/1998 | Lilly et al. ............. 364/468.01 |
| 5,946,662 A | 8/1999 | Ettl et al. ...................... 705/8 |
| 5,970,465 A | 10/1999 | Dietrich et al. ................ 705/7 |
| 5,974,395 A | 10/1999 | Bellini et al. .................. 705/9 |
| 6,047,290 A | 4/2000 | Kennedy et al. ............ 707/103 |
| 6,055,519 A | 4/2000 | Kennedy et al. .............. 705/80 |
| 6,088,626 A | 7/2000 | Lilly et al. .................. 700/100 |
| 6,151,582 A | 11/2000 | Huang et al. ................... 705/8 |
| 6,157,915 A | 12/2000 | Bhaskaran et al. ............. 705/7 |
| 2001/0020230 A1 * | 9/2001 | Kaneko et al. ................. 705/8 |

\* cited by examiner

Primary Examiner—Leo Picard
Assistant Examiner—Michael D. Masinick
(74) Attorney, Agent, or Firm—Schmeiser, Olsen, Watts; Richard M. Kotulak

(57) ABSTRACT

A method and system for computing a supply chain planning process efficiency E in relation to manufacturing activities of an organization. Input data, including supply and demand input data, is received beginning at time $T_0$. An iteration index R is set equal to 0. Then the method and system implements: incrementing R by 1; adjusting the input data (i.e., changing, deleting, or updating the input data); executing a central planning engine (CPE), using the input data; analyzing results of executing the CPE; and iterating, or computing and stopping. The iterating repeats the incrementing, adjusting, executing, and analyzing. The computing computes E. E may be a function of Q, C, and $R^P/T$. Q is a manual edit ratio in conjunction with adjusting the input data, C=S/D, S is supply, D is demand, $T=T_E-T_0$, and P is a real number.

30 Claims, 3 Drawing Sheets

COMPUTATION OF SUPPLY CHAIN PLANNING PROCESS EFFICIENCY

BACKGROUND OF THE INVENTION

1. Technical Field

The present invention relates to a method and system for calculating supply chain planning process efficiency.

2. Related Art

Although algorithms have been used to assess manufacturing processes, there is a lack of algorithms relating planning aspects of manufacturing. Thus there is a need for algorithms that relate to planning aspects of manufacturing.

SUMMARY OF THE INVENTION

The present invention provides a method for computing a supply chain planning process efficiency E, comprising the steps of:

receiving input data, wherein the input data includes supply input data and demand input data;

setting an iteration index R equal to 0;

incrementing R by 1;

adjusting the input data;

executing a central planning engine, using the input data;

analyzing results of executing the central planning engine; and deciding whether to iterate or to stop, and if deciding to iterate then repeating the incrementing, adjusting, executing, analyzing, and deciding, or if deciding to stop then computing followed by stopping, wherein the computing comprises computing the efficiency E.

The present invention provides a system for computing a supply chain planning process efficiency (E), comprising a supply database, a demand database, and an algorithm adapted to:

receive input data, wherein the input data includes supply input data from the supply database and demand input data from the demand database;

set an iteration index R equal to 0;

increment R by 1;

adjust the input data;

execute a central planning engine, using the input data;

analyze results of having executed the central planning engine; and decide whether to iterate or to stop, and if having decided to iterate then the algorithm adapted to again increment, adjust, execute, analyze, and decide, or if having decided to stop then the algorithm adapted to compute and to stop, wherein to compute comprises to compute the efficiency E.

The present invention advantageously provides a method and system that computes a supply chain planning process efficiency in relation to planning aspects of manufacturing.

DETAILED DESCRIPTION OF THE INVENTION

Figure 1:
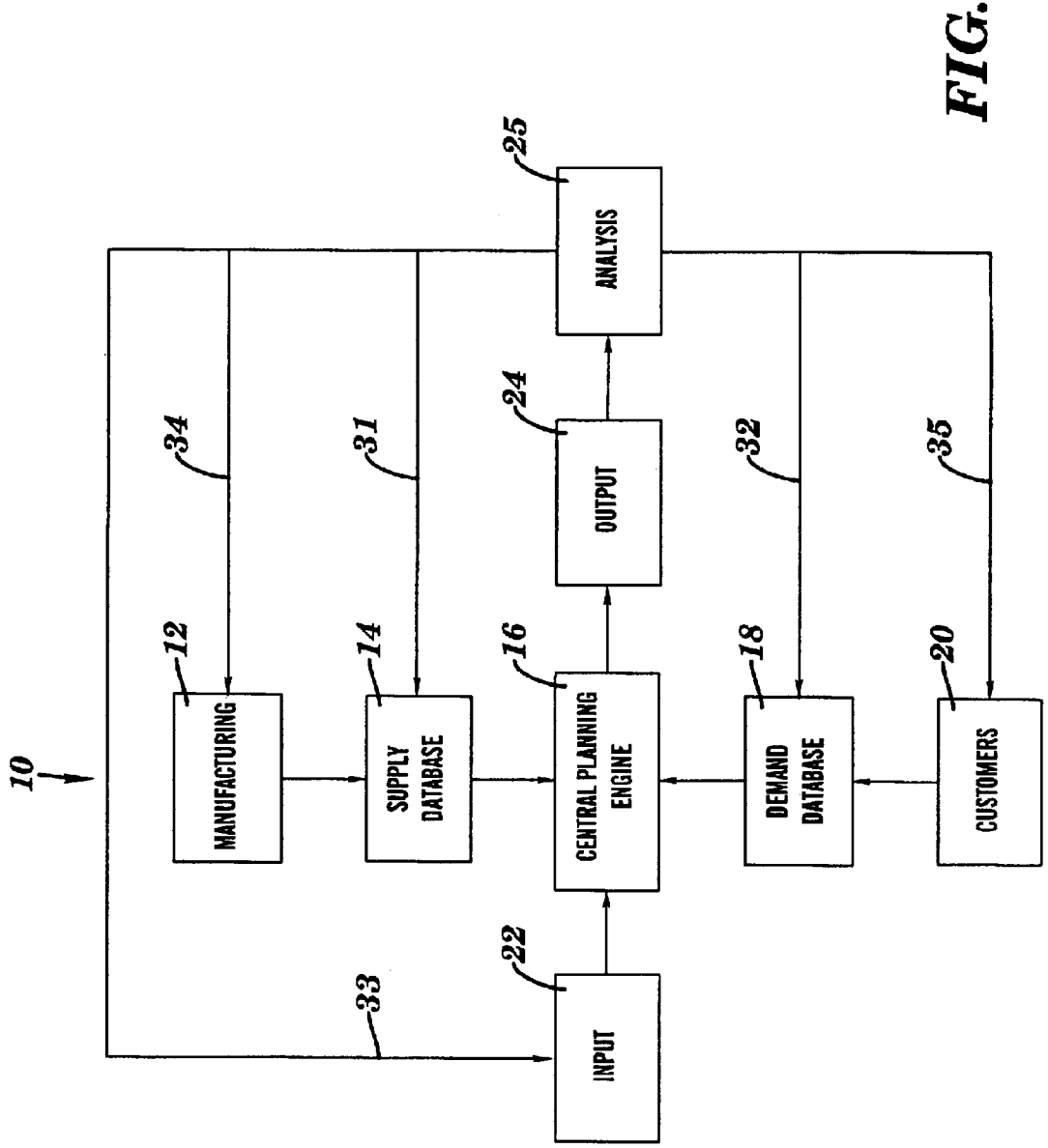
FIG. 1 illustrates a block diagram of a system for calculating supply chain planning process efficiency, in accordance with embodiments of the present invention.

An organization that manufactures items for customers may need to vary manufacturing parameters in response to changes in customer demand for the items. The organization may comprise, inter alia, a business such as a corporation, a governmental agency, a labor union, charitable organization, etc. The items may comprise, inter alia, devices, parts, units, products, etc. The manufacturing parameters may include, inter alia, hardware capacity for producing the items, the rates at which the various items are produced for the existing or planned hardware, prioritization of utilizing the various hardware capacities, storage capacity for stocking inventory of the items, items actually stored in inventory, etc. Hardware may comprise, inter alia, machines, tools, etc. Setting the manufacturing parameters controls the supply of items produced in response to the customer demand.

The customer demand may comprise, inter alia, orders demand and forecast demand. Orders demand is dictated by orders of currently placed orders of items, as may be expressed in terms of, inter alia: item identification, quantity, price, delivery date, etc. Forecast demand is dictated by expected future orders of items as estimated from, inter alia, communications from customers, past ordering practices of customers, economic parameters (e.g., interest rates, money supply, inflation/recession, industry cycles), etc. Forecast demand may or may not exist. If forecast demand exists, the organization may or may not take the forecast demand into account when setting the manufacturing parameters.

The organization's supply of items may comprise, inter alia, allocated supply and overage. Allocated supply includes items in production or inventory that correspond to, and thus satisfy, orders demand of customers. Overage includes items in inventory that are in excess of items required to satisfy orders demand. Overage may serve to satisfy forecast demand. The organization may or may not generate overage, depending on such factors as, inter alia, existence or non-existence of forecast demand, reliability of the forecast demand, production capability, time duration for manufacturing the items, storage capacity for storing inventory, business practices in the industry, etc.

The process of computation and analysis for setting of manufacturing to align supply with demand is called a "supply chain planning process" which is implemented by software called a Central Planning Engine (CPE). The CPE is a tool used to plan for configuring supply in response to demand in the manufacturing of items (e.g., for supplying items to many different customers who have ordered the parts). The CPE calculates, inter alia: what hardware (e.g., machines, tools, etc.) should be introduced into manufacturing, expediting the use of selected hardware, prioritizing the use of the available hardware, predicting times when hardware will be available for satisfying customer orders, calculating the amounts of each item that can be generated per hour, etc. Executing the CPE may comprise linear programming analysis, and may consume a great deal of time (e.g., hours or days) if the quantity of demand data and supply data is massive and complex (e.g., if there are thousands of active parts being generated in the manufacturing line on a daily basis), and if there are numerous ways to combine the manufacturing parameters. For example, the organization may have numerous customers such that each customer may order multiple items and may request a complex schedule of delivery dates. Additionally, said process of computation and analysis may be an iterative process, with each iteration improving the manufacturing parameters such that the supply is more closely aligned with the demand in successive iterations. Each such iteration may consume a great deal of time (e.g., 6 to 10 hours).

The present invention presents a method and system for computing an efficiency (E) of the supply chain planning process. The efficiency E takes into account some or all of the following factors: controlling the data integrity of the input data to the CPE, the time required to run an iteration of the CPE, the number of iterations executed by the CPE, and extent to which supply is aligned with demand as embodied in a parameter called "coverage" which will be defined infra. Thus, computing E takes into account efficiencies and inefficiencies of the CPE. Note that E takes into account the supporting planning process outside of the CPE.

Controlling the data integrity of the input data to the CPE may require adjusting the input data to the CPE. Adjusting the input data may comprise changing, deleting, or adding to the input data for such purposes as, inter alia, correcting errors in the input data, updating the input data, and optimizing the input data as a result of analyzing the output of the CPE for each iteration. An example of an error in the input data requiring adjustment of the input data is where corporation C1 has ordered 10,000 parts from the organization and subsequently informs the organization that it is actually ordering only 1,000 parts. An example of a situation requiring updating the input data is where corporation C2 has ordered part A and subsequently updates its design to replace part A with part B. Optimizing the input data means adjusting the input data to improve the supply chain planning process. An example of adjusting the input data to optimize the input data is changing the priorities of some items relative to other items to move C closer to 1 (e.g., to move C from 0.90 to 0.92).

As a special case, adjusting the input data includes the null adjustment case for which nothing is done to the input data, such as when there in no need to change, delete, or add to the input data. Adjusting the input data may be performed manually, by execution of computer code, or both. Thus in practice, when a person or computer code adjusts the input data, the person or computer code changes, deletes, and/or adds to the input data only if there is a need to do so. The person or computer code may in the course of the adjusting have to make a decision on whether or not to change, delete, and/or add to the input data.

FIG. 1 illustrates a block diagram of a system 10 for calculating a supply chain planning process efficiency (E), in accordance with embodiments of the present invention. The system 10 comprises a central planning engine (CPE) 16, a demand database 18, and a supply database 14. The demand database 18 stores the customer demand data, which may include orders demand data and forecast demand data. The supply database 14 stores data relating to the manufacturing parameters discussed supra. Data in the demand database 18 is derived from customers 20 (e.g., from booked customer orders and from customer-communicated forecasts of future orders) and from other sources (not shown in FIG. 1) such as, inter alia, estimates of forecast demand, sources of economic data, etc. Data in the supply database 14 is derived from manufacturing 12, which includes such information as manufacturing hardware, existing or available workers (e.g., employees, contractors, etc.), raw materials used to manufacture the items, manufacturing costs, and generally those variables that relate to the manufacturing parameters discussed supra. The "database" of the demand database 18 and the supply database 14 is defined herein as any storage mechanism such as a relational database, a flat database, spreadsheets, tables, files, etc. The demand database 18 and the supply database 14 may be stored separately in hardware (e.g., hard drive, optical disk, magnetic tape, etc.) and/or software (e.g., relational database, a flat database, spreadsheets, tables, files, etc.) or may be stored together in the same hardware and/or software.

The CPE 16 receives demand input from the demand database 18, supply input from the supply database 14, and input 22 which comprises input other than demand input and supply input. The input 22 may include, inter alia, parameters characterizing the mathematical model utilized by the CPE 16 for calculating the efficiency E, and parameters governing whether and how to iterate, what output to store and/or display, etc. The CPE 16 generates output 24 may comprise the efficiency E. If E is calculated subject to uncertainty in the input data, then E may be calculated and outputted as an expected efficiency or a mean efficiency with a measure of the statistical uncertainty in E (e.g., standard deviation).

An analysis 25 of the output 24 follows generation of the output 24. The analysis may be performed manually (i.e., by individual(s)), by execution of software such as algorithm that comprises the CPE 16 (see, e.g., step 47 of the flow chart 40 shown in FIG. 2, described infra), or by both. The output 24, and the analysis 25 thereof, may include the number of items of each item type that will be manufactured with an indication of how many of said number of items of each type serve to satisfy customer orders demand and how many of said number of items of each type are to be put into inventory, how much demand is uncovered (if applicable), and how much supply is undemanded (if applicable). The analysis 25 may be performed following each iteration executed by the CPE, and the analysis 25 may provide a basis for deciding whether to stop the calculation of E or to perform one or more additional iterations by the CPE. For example, said deciding consider the benefit of having a 1% better coverage (i.e., coverage C is defined as the ratio of supply to demand) by running the one or more additional iterations, balanced against the cost of executing the one or more of such iterations.

In consideration of said deciding, the analysis 25 may feed into any or all of: the supply database 14, the demand database 18, the input 22, the manufacturing 12, and the customers 20. After each iteration, the analysis 25 may feed 31 into the supply database 14 by adjusting the manufacturing parameters that exist in the supply database 14, for the purpose of improving or optimizing E (e.g., aligning supply closer to demand). After each iteration, the analysis 25 may feed 32 into the demand database 18 such as by adjustment of forecast demand parameters in the demand database 18 to the extent that forecast demand parameters may be influenced by the results of the analysis 25 (e.g., the analysis 25 may ascertain, based on comparing past customer orders with current customer orders, that the forecast demand in the demand database 18 is inaccurate and thus feed an updated forecast demand into the demand database 18). After each iteration, the analysis 25 may feed 33 into the input 22 to change the input data that is stored in the input 22, in order to improve or optimize E (e.g., aligning supply closer to demand). After the final iteration, the analysis 25 may feed 34 into the manufacturing 12 to adjust hardware, scheduling, etc. of the physical manufacturing 12 facilities in order to trigger manufacturing parameter adjustments. After the final iteration, the analysis 25 may feed 35 into the customers 20 through, inter alia, marketing efforts by the organization to demonstrate to the customers 20 that the organization is doing a good job of satisfying customer orders and of forecasting future customer orders.

Figure 2:
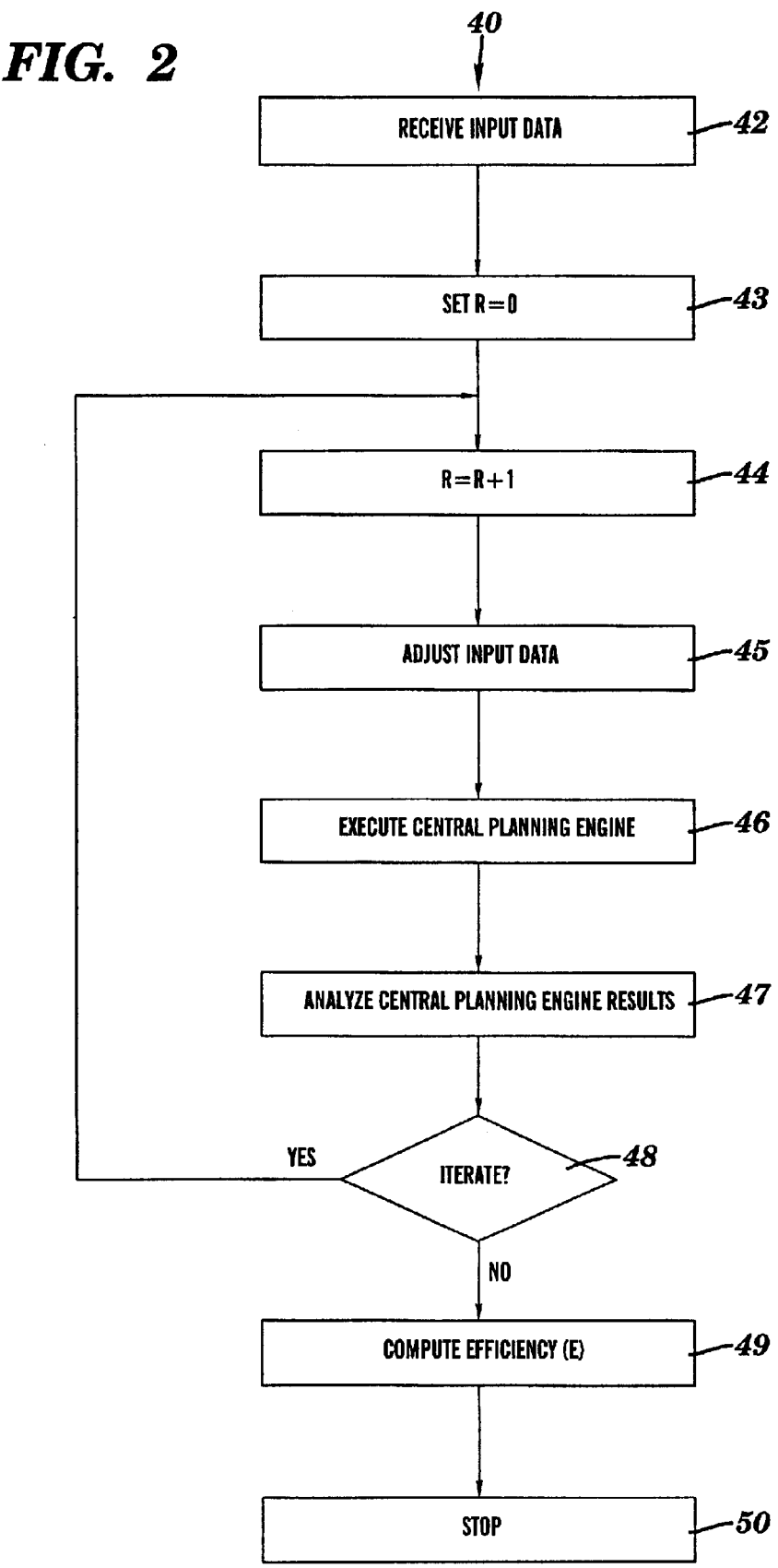
FIG. 2 is a flow chart of an algorithm that implements the calculation of supply chain planning process efficiency for the system of FIG. 1, in accordance with embodiments of the present invention.

FIG. 2 is a flow chart 40 of an algorithm that implements the calculation of the supply chain planning process efficiency (E) for the system 10 of FIG. 1, in accordance with embodiments of the present invention. The algorithm of FIG. 2 has begins at time T0 with step 42, namely receiving (by the CPE 16 of FIG. 1) the input data. Said input data received in step 42 comprises the demand input from the demand database 18 FIG. 1, the supply input from the supply database 14 of FIG. 1, and input 22 of FIG. 1.

In FIG. 2, R is an iteration index, and R is set equal to zero in step 43. The iteration loop in FIG. 2 comprises steps 44–48. Step 44 comprises incrementing R is by 1. Step 45 comprises adjusting the input data to the CPE 16 of f FIG. 1, where the input data is as described supra in conjunction with step 42. Adjusting the input data in step 45 comprises manually adjusting the input data, adjusting the input data by execution of computer code, or both. As explained supra, adjusting the input data controls the data integrity of the input data by, inter alia, changing, deleting, or adding to the input data, or doing nothing with the input data. Step 46 comprises executing the central planning engine. (CPE) Step 47 comprises analyzing the results of having executed the CPE in step 46, which corresponds to the analysis 25 of FIG. 1. Step 48 of FIG. 2 is a decision block for deciding whether to stop (i.e. end) execution of the algorithm or whether to perform the next iteration by again executing steps 44–48. The scope of the present invention includes a non-iterating embodiment such the algorithm stops at the first execution of step 48 at which R=1. For an iterating embodiment of the present invention, deciding in step 48 whether to iterate is made based on the analyzing in step 47. The decision in step 48 may be to stop if the coverage C is within a tolerance of some specified value.

If deciding to stop in step 48, then the algorithm computes the supply chain planning process efficiency E in step 49, followed by stopping in step 50. In step 49, E may be computed as a function of Q, C, $R^P/T$, wherein Q is a manual edit ratio in conjunction with said adjusting the input data, wherein C is a "coverage" calculated as a ratio of S to D, wherein S is supply, wherein D is demand, wherein T is a total elapsed time calculated as $T=T_E-T_0$, and wherein P is a real number.

The manual edit ratio Q indicates the impact on total elapsed time T of manually adjusting the input data in step 45 of FIG. 2. As stated supra, adjusting the input data (which may be accomplished manually, by execution of computer code, or both) improves the input data integrity and may comprise: correcting errors in the input data, updating the input data, and optimizing the input data. Manually adjusting the input data consumes time and makes the supply chain planning process less efficient. Q may be calculated via:

$$Q=Q_M/Q_T \quad (1)$$

wherein $Q_M$ is a any measure of the amount of input data that is adjusted, and $Q_T$ is a corresponding measure of the total amount of input data. $Q_M$ and $Q_T$ may be defined in various ways. For example, $Q_M$ could denote the number of input-variable manual adjustments, with $Q_T$ denoting the total number of input variables. As another example, $Q_M$ could denote the total number of bits in input variables that have been manually adjusted, with $Q_T$ denoting the total number of bits in the input variables. $Q_M$ and $Q_T$ may include a weighting factor such as, inter alia, an estimated relative amount of time required for adjusting each input variable, since different manual adjustments take different amounts of time. Each type of manual intervention is a potential source of error. Thus, if 5% of the input data is affected by manual intervention, then said 5% of the input data could potentially contain errors. The preceding examples are merely exemplary and the present invention includes any method of calculating Q that reflects the adverse impact of manual input adjustments on supply chain planning process efficiency.

The demand D comprises orders demand. The demand D may also comprise forecast demand, if forecast demand is included in the algorithm and is elected to be used, or not excluded from being used, by the user of the algorithm. The demand D reflects the number of ordered items, and may be calculated via, inter alia:

$$D=â^{\wedge}{}_i W_i N_i \quad (2)$$

wherein "i" is an item index such that different items are associated with different values of i . . . $N_i$ is the number (i.e., quantity) of item i that has been actually ordered, and also includes the number of items forecast to be ordered if D includes forecast demand. $W_i$ is a weighting factor associated with item i. As an example, $W_i$ may be the price of item i. As another example, $W_i$ may be set to a constant value (e.g., 1) resulting in the items in D being effectively unweighted. As yet another example, Wi could be set equal to zero for selected values of i, in order to exclude the items associated with the selected values of i from contributing to D. Note that D does not necessarily denote the number of items actually ordered and/or forecast, but rather denotes the number of items ordered and/or forecast as modeled in the execution 46 and/or analysis 47 of the central planning engine (e.g., the forecast component of D could be adjusted for modeling purposes between successive iterations of the algorithm of FIG. 2). In Equation (2), $â^{\wedge}{}_i$ denotes a summation over i of $W_i N_i$ from i=1 to i=I, wherein I is the number of different items. The scope of the present invention includes other definition of D than is exhibited in Equation (2). For example, D could include various functions of $N_i$ such as $(N_i)^X$, wherein X>0.

The supply S includes allocated supply. The supply S may also include overage, if overage is included in the algorithm and is elected to be used, or not excluded from being used, by the user of the algorithm. The supply S reflects the number of items in production and inventory, and may be calculated via, inter alia:

$$S=â^{\wedge}{}_i V_i M_i \quad (3)$$

wherein "i" is an item index as in Equation (2). $M_i$ is the number (i.e., quantity) of item i that is in production or inventory in conjunction with allocated supply, and also in conjunction with overage if S includes overage. $V_i$ is a weighting factor associated with item i. As an example, Vi may be the price of item i. As another example, $V_i$ may be set to a constant value (e.g., 1) resulting in the items in S being effectively unweighted.

As still another example, $V_i$ could be set equal to zero for selected values of i, in order to exclude the items associated with the selected values of i from contributing to S. The weights $V_i$ in Equation (3) are independent of the weights $W_i$ in Equation (2), but the weights $V_i$ could be set equal to the weights $W_i$. Note that S does not necessarily denote the number of items actually in production and actually in inventory, but rather denotes the number of items in production and inventory as modeled in the execution 46 and/or analysis 47 of the central planning engine (i.e., S could be adjusted for modeling purposes between successive iterations of the algorithm of FIG. 2). In Equation (3), $\hat{a}^{\wedge}{}_i$ denotes a summation over i of $V_i M_i$ from i=1 to i=I. The scope of the present invention includes other definition of S than is exhibited in Equation (3). For example, S could include various functions of $M_i$ such as $(M_i)^Y$, wherein Y>0.

The parameter C is calculated via $$C = S/D \tag{4}$$

and C expresses the extent to which S is aligned with D, or the extent to which S exceeds D or is less than D.

The efficiency E may be expressed as a function of Q, C, R/T, and R. Based on Equation (1), Q may vary from 0 to 1, and E is a decreasing function of Q (i.e., $\hat{a}^{\wedge}, E/\hat{a}^{\wedge}, Q<0$) such that E=0 at Q=1. E may be proportional to a function F1(Q) satisfying the preceding constraints, wherein $F_1(Q)$ is:

$$F_1(Q) = (1-Q)^Z \tag{5}$$

wherein Z is a positive real number; e.g., Z=1.

As to the parameter C, since C=1 reflects a perfect alignment of supply S with demand D, E is a peaked function of C at C=1; i.e., $\hat{a}^{\wedge}, E/\hat{a}^{\wedge}, C=0$ at C=1 and $\hat{a}^{\wedge,2} E/\hat{a}^{\wedge}, C^2 < 0$ at C=1. E may be proportional to a function $F_{2A}(C)$ satisfying the preceding constraints, wherein $F_2(Q)$ is:

$$F_{2A}(C) = (1 - \hat{a}^{\wedge} £C - 1\hat{a}^{\wedge}£)^G \tag{6}$$

and wherein G is a positive real number (e.g., G=1). When G is an odd integer, C additionally satisfies C<2 in order that $F_{2A}(C) \hat{a}\%¥ 0$. Another class of functions $F_{2B}(C)$ satisfying the preceding constraints is:

$$F_{2B}(C) = \text{a normal distribution having a mean at C=1} \tag{7}$$

and having a standard deviation that may be set to a value that reflects a desired sensitivity of $F_{2B}(C)$ to variations in C. Since $F_{2B}(C) > 0$ is satisfied for any value of C, use of $F_{2B}(C)$ does not place a limitation on C as does $F_{2A}(C)$.

As to R/T, which denotes an average number of iterations per unit time (e.g., iterations/hour), E is an increasing function of R/T. If E varies linearly with R/T, the E may have the form:

$$E = K_1 * F_1(Q) * F_2(Q) * (R/T) \tag{8}$$

wherein $F_1(Q)$ is depicted in Equation (5), $F_2(Q)$ is depicted as $F_{2A}(C)$ in Equation (6) or as $F_{2B}(C)$ in Equation (7), and $K_1$ is a constant. However, E may also be a decreasing function of the total number of iterations R, since the total elapsed time T increases as R increases. For example, if a variation of E of $E\hat{a}^{\wedge}\square 1/R$ is appended to Equation (8), then Equation (8) is replaced by:

$$E = K_2 * F_1(Q) * F_2(Q)/T \tag{9}$$

wherein $K_2$ is a constant. Equations (8) and (9) may be generalized to:

$$E = K_3 * F_1(Q) * F_2(Q) * (R^P/T) \tag{10}$$

where P is a real number, and wherein $K_3$ is a constant. Equation (10) reduces to Equation (8) if P=1 and to Equation (9) if P=0.

A highly simplified expression for E derived from Equation (10) using P=1, Z=1 in $F_1(Q)$ (see Equation (5)), and $F_2(Q) = F_{2A}(Q)$ with G=1 (see Equation (6)) is:

$$E = K_4 * (1-Q) * (1 - \hat{a}^{\wedge} £C - 1\hat{a}^{\wedge}£) * (R/T) \tag{11}$$

wherein $K_4$ is a constant.

As may be seen from the preceding discussion, there are numerous ways to model the computation of E.

The efficiency E may be a stratified efficiency; i.e., E may be keyed to such variables as item number, business unit, customer, date range, and combinations thereof. Otherwise, E is an unstratified efficiency. A stratified efficiency is an efficiency that is based on a subset of the supply and/or demand data that is less than all of the supply and/or demand data, based on a variable that causes some of the supply and/or demand data to be excluded from entering into the computation of E. For example, a stratified efficiency keyed to business unit considers only demand and supply input that is associated with one or more specified business units, and does not consider demand and supply input that is associated with other business units that are outside of the one or more specified business units.

Figure 3:
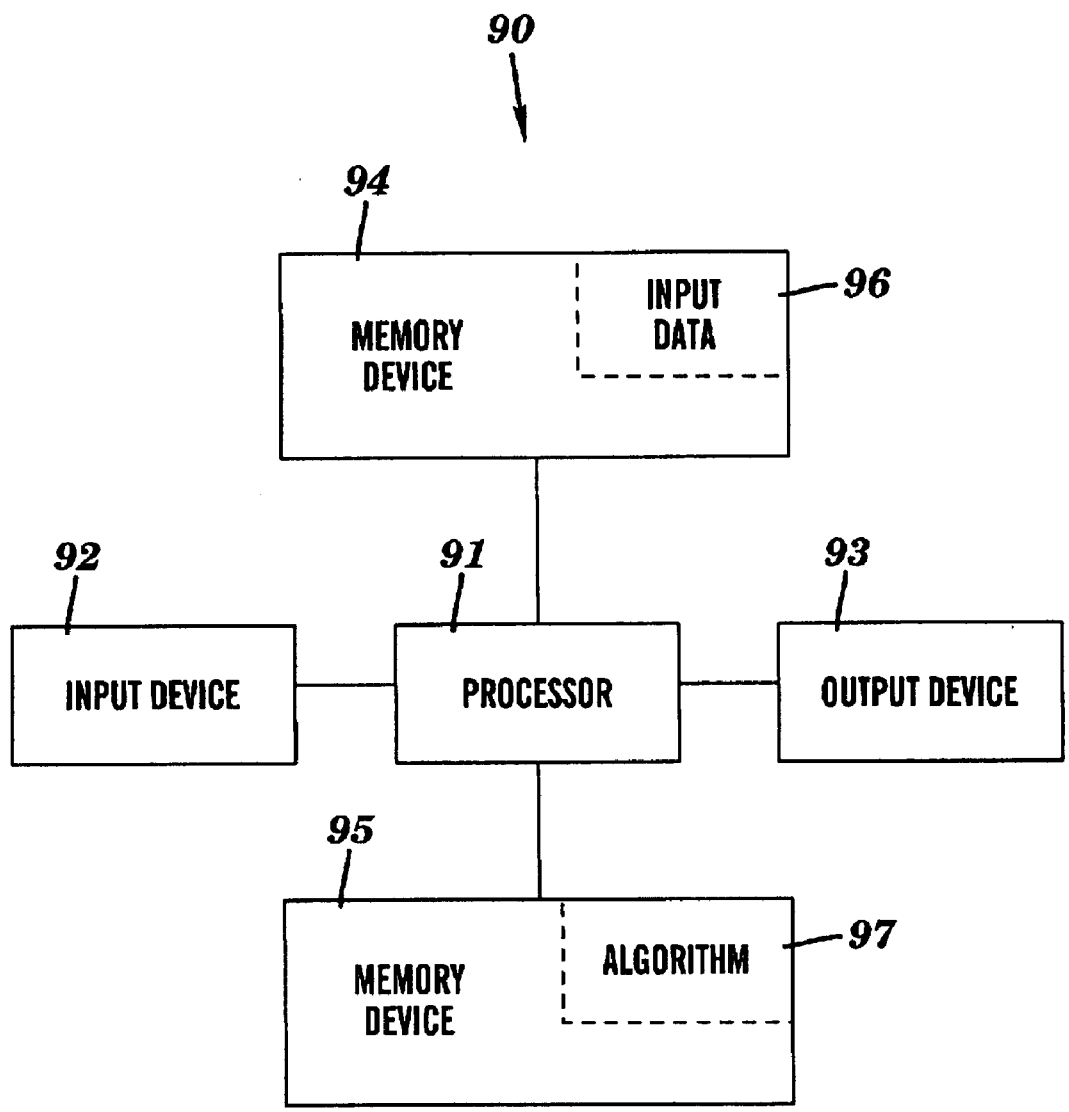
FIG. 3 depicts a computer system for implementing the calculation of supply chain planning process efficiency for the system of FIG. 1, in accordance with embodiments of the present invention.

FIG. 3 depicts a computer system 90 for implementing the calculation of supply chain planning process efficiency for the system of FIG. 1 and the algorithm of FIG. 2, in accordance with embodiments of the present invention. The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a dynamic random access memory (DRAM), a read-only memory (ROM), etc. The memory device 95 includes an algorithm 97, namely the algorithm depicted in the flow chart of FIG. 2. The processor 91 executes the algorithm 97. The memory device 94 includes input data 96. The input data 96 includes input required by the algorithm 97, namely the demand data derived from the demand database 18 of FIG. 1, the supply data derived from the supply database 14 of FIG. 1, and other input from the input 22 of FIG. 1. The output device 93 displays output from the algorithm 97.

While FIG. 3 shows the computer system 90 as a particular configuration of hardware and software, any configuration of hardware and software, as would be known to a person of ordinary skill in the art, may be utilized for the purposes stated supra in conjunction with the particular computer system 90 of FIG. 3. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for computing a supply chain planning process efficiency E, comprising the steps of:
   receiving input data beginning at a time $T_0$, wherein the input data includes supply input data and demand input data;
   setting an iteration index R equal to 0;
   incrementing R by 1;
   adjusting the input data;
   executing a central planning engine, using the input data;
   analyzing results of executing the central planning engine; and
   deciding whether to iterate or to stop, and
      if deciding to iterate then repeating the incrementing, adjusting, executing, analyzing, and deciding, or
      if deciding to stop then computing followed by stopping, wherein the computing comprises computing at time $T_E$ the efficiency E as a function of Q, C, and $R^P/T$, wherein Q is a manual edit ratio in conjunction with said adjusting the input data, wherein C=S/D, wherein S is supply, wherein D is demand, wherein $T=T_E-T_0$, and wherein P is a real number.

2. The method of claim 1, wherein E is a decreasing function of Q, an increasing function of $R^P/T$, and a peaked function of C at C=1.

3. The method of claim 1, wherein P is selected from the group consisting of 0 and 1.

4. The method of claim 1, wherein deciding to stop occurs at R=1.

5. The method of claim 1, wherein S includes allocated supply and overage.

6. The method of claim 1, wherein D includes orders demand and forecast demand.

7. The method of claim 1, wherein D includes orders demand and does not include forecast demand.

8. The method of claim 1, wherein the deciding step is performed manually.

9. The method of claim 1, wherein the deciding step is performed by execution of software.

10. The method of claim 1, wherein E is an unstratified efficiency.

11. A system for computing a supply chain planning process efficiency (E), comprising a supply database, a demand database, and an algorithm adapted to:
    receive input data beginning at a time $T_0$, wherein the input data includes supply input data from the supply database and demand input data from the demand database;
    set an iteration index R equal to 0;
    increment R by 1;
    adjust the input data;
    execute a central planning engine, using the input data;
    analyze results of having executed the central planning engine; and
    decide whether to iterate or to stop, and
       if having decided to iterate then the algorithm adapted to again increment, adjust, execute, analyze, and decide, or
       if having decided to stop then the algorithm adapted to compute and to stop, wherein to compute comprises to compute at time $T_E$ the efficiency E as a function of Q, C, and $R^P/T$, wherein Q is a manual edit ratio in conjunction with said to adjust the input data, wherein C=S/D, wherein S is supply, wherein D is demand, wherein $T=T_E-T_0$, and wherein P is a real number.

12. The system of claim 11, wherein E is a decreasing function of Q, an increasing function of $R^P/T$, and a peaked function of C at C=1.

13. The system of claim 11, wherein P is selected from the group consisting of 0 and 1.

14. The system of claim 11, wherein S includes allocated supply and overage.

15. The system of claim 11, wherein D includes orders demand and forecast demand.

16. The system of claim 11, wherein D includes orders demand and does not include forecast demand.

17. The system of claim 11, wherein to decide whether to iterate or to stop comprises to decide manually whether to iterate or to stop.

18. The system of claim 11, wherein to decide whether to iterate or to stop comprises to decide by execution of software whether to iterate or to stop.

19. The system of claim 11, wherein E is an unstratified efficiency.

20. A computer program product, comprising a computer usable medium having a computer readable program code embodied therein for computing a supply chain planning process efficiency (E), said computer readable program code including an algorithm adapted to:
    receive input data beginning at a time $T_0$, wherein the input data includes supply input data and demand input data;
    set an iteration index R equal to 0;
    increment R by 1;
    adjust the input data;
    execute a central planning engine, using the input data;
    analyze results of having executed the central planning engine; and
    decide whether to iterate or to stop, and
       if having decided to iterate then the algorithm adapted to again increment, adjust, execute, analyze, and decide, or
       if having decided to stop then the algorithm adapted to compute and to stop, wherein to compute comprises to compute at time $T_E$ the efficiency E as a function of Q, C, and $R^P/T$, wherein Q is a manual edit ratio in conjunction with said to adjust the input data, wherein C=S/D, wherein S is supply, wherein D is demand, wherein $T=T_E-T_0$, and wherein P is a real number.

21. A method for computing a supply chain planning process efficiency E, comprising the steps of:
    receiving input data, wherein the input data includes supply input data and demand input data;
    setting an iteration index R equal to 0;
    incrementing R by 1;
    adjusting the input data;
    executing a central planning engine, using the input data;
    analyzing results of executing the central planning engine; and
    deciding whether to iterate or to stop, and
       if deciding to iterate then repeating the incrementing, adjusting, executing, analyzing, and deciding, or
       if deciding to stop then computing followed by stopping, wherein the computing comprises computing the efficiency E.

22. A system for computing a supply chain planning process efficiency (E), comprising a supply database, a demand database, and an algorithm adapted to:

receive input data, wherein the input data includes supply input data from the supply database and demand input data from the demand database;

set an iteration index R equal to 0;

increment R by 1;

adjust the input data;

execute a central planning engine, using the input data;

analyze results of having executed the central planning engine; and decide whether to iterate or to stop, and
- if having decided to iterate then the algorithm adapted to again increment, adjust, execute, analyze, and decide, or
- if having decided to stop then the algorithm adapted to compute and to stop, wherein to compute comprises to compute the efficiency E.

23. The computer program product of claim 20, wherein E is a decreasing function of Q, an increasing function of $R^P/T$, and a peaked function of C at C=1.

24. The computer program product of claim 20, wherein P is selected from the group consisting of 0 and 1.

25. The computer program product of claim 20, wherein S includes allocated supply and overage.

26. The computer program product of claim 20, wherein D includes orders demand and forecast demand.

27. The computer program product of claim 20, wherein D includes orders demand and does not include forecast demand.

28. The computer program product of claim 20, wherein to decide whether to iterate or to stop comprises to decide manually whether to iterate or to stop.

29. The computer program product of claim 20, wherein to decide whether to iterate or to stop comprises to decide by execution of software whether to iterate or to stop.

30. The computer program product of claim 20, wherein E is an unstratified efficiency.

* * * * *